United States Patent Office 2,894,921
Patented July 14, 1959

2,894,921

STABILIZED HYDROPHILIC POLYMERS

John F. Jones, Cuyahoga Falls, Ohio, assignor to The B. F. Goodrich Company, New York, N.Y., a corporation of New York No Drawing. Application February 28, 1955
Serial No. 491,223

12 Claims. (Cl. 260—17.4)

This invention relates to stabilized hydrophilic, water-swellable polymers and more particularly pertains to interpolymers of (1) alpha-beta unsaturated polybasic acids or their anhydrides, and (2) vinyl-alkyl ethers with or without (3) polyunsaturated cross-linking agents, to which interpolymers a water-soluble hydroxy quinoline is added to stabilize aqueous mucilages of the polymers against extreme viscosity decreases. This invention also relates to methods of stabilizing alpha-beta unsaturated polybasic acid or alpha-beta unsaturated polybasic anhydride-vinyl alkyl ether interpolymers by the admixture of a water-soluble 8-hydroxy quinoline with the interpolymer.

In my copending application Serial No. 404,784, filed January 18, 1954, there are disclosed a number of hydrophilic polymers which are formed by the conjoint polymerization of polybasic, alpha-beta unsaturated acids or anhydrides, vinyl alkyl ethers, and polyunsaturated cross-linking agents and in my copending application Serial No. 472,257, filed November 30, 1954, I have disclosed that certain water-soluble organic thioamides are excellent viscosity stabilizers for mucilages of the polymeric materials described above. The acid or acid anhydride forms of the cross-linked interpolymers can be converted to salts, partial esters or partial amides. These cross-linked polymeric derivatives are not truly soluble in water or in alkaline aqueous media, but they do possess the characteristic of being able to swell in water to form viscous mucilages or gels at low concentrations and over a fairly wide pH range. The mucilages and gels are excellent emulsifying and suspending agents when freshly prepared, but they have the disadvantage of gradually losing their viscosity over a period of several months. Linear or non-cross-linked copolymers of alpha-beta unsaturated acids or anhydrides thereof and alkyl vinyl ethers and partial esters, amides and salts also form viscous mucilages at relatively high concentrations in aqueous media, and these mucilages also undergo severe decreases in viscosity on standing over a period of time. This viscosity loss is so marked in some instances that the viscosity retention of the polymer in about 2 months in aqueous media is less than 10% of that of the freshly prepared mucilage. Another undesirable effect in aqueous mucilages of conjoint polymers of polyhydric alpha-beta unsaturated acids or anhydrides and vinyl alkyl ethers, whether cross-linked or not is the development of a dark color on standing. This latter undesirable characteristic is also controlled by the same stabilizing ingredients that prevents viscosity loss.

It is an object of this invention to provide polymers of polyhydric alpha-beta unsaturated acids or anhydrides, and vinyl alkyl ethers, with or without polyunsaturated cross-linking agents, which polymers have viscosity stability in aqueous media over long periods of time by the admixture with the polymer of a water-soluble 8-hydroxy quinoline as a stabilizing ingredient.

Another object is the provision of a salt, partial ester or partial amide derivative of an alpha-beta unsaturated dibasic acid anhydride, and a vinyl alkyl ether with or without a minor amount of polyunsaturated cross-linking agent, which interpolymer contains a water-soluble 8-hydroxy quinoline as a viscosity stabilizing ingredient.

Numerous other objects will be apparent from the detailed description of the preferred embodiment of the invention which follows.

The above objects are accomplished first by preparing the polymers described hereinabove and then adding a suitable quantity of stabilizing ingredient, usually in the range of about 0.05 to about 2% or more by weight based on the mucilage or 3 to 120% based on the dry copolymer. The stabilizing ingredient can be added to the dry polymer or it can be added to an aqueous mucilage.

The amount of 8-hydroxy quinoline needed to prevent drastic losses in viscosity of aqueous mucilages of the polymers will vary somewhat depending on conditions under which the polymeric mucilage is held. In general, however, amounts of stabilizing ingredient ranging from about .1% to about 2% by weight based on the weight of mucilage or 6 to 120% based on the dry polymer is sufficient to show a marked improvement in viscosity retention.

The polymers are prepared from two essential monomeric materials, namely, (1) an alpha-beta unsaturated dicarboxylic acid anhydride, and (2) an alkyl vinyl ether in which the alkyl portion of the molecule has from 1 to 8 carbon atoms. The cross-linked interpolymers contain a poly-unsaturated cross-linking agent as an additional essential ingredient.

The dicarboxylic acid anhydrides have the general structure:

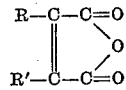

wherein R and R' are selected from the group consisting of hydrogen, halogen, cyano, alkyl, aryl, alkaryl, aralkyl and cycloaliphatic groups. Illustrative anhydrides include maleic anhydride, chloromaleic anhydride, 2,3-dichloromaleic anhydride, 2,3-dicyano maleic anhydride, 2,3-dimethyl maleic anhydride, 2,3-diphenyl maleic anhydride, 2,3-dibenzyl maleic anhydride, 2,3-di(p-methylphenyl) maleic anhydride, 2,3-dicyclohexyl maleic anhydride, 2-methyl maleic anhydride, 2-ethyl maleic anhydride, 2-cyano maleic anhydride, 2-propyl maleic anhydride, 2-phenyl, 2-benzyl, 2(p-methylphenyl and 2-cyclohexyl) maleic anhydrides. Maleic anhydride is preferred because of its ready availability and comparatively low cost. The poly-basic acid moieties of the polymers of this invention are those which result from the hydrolysis of the anhydride linkage of the above anhydrides.

The vinyl ether monomers include vinyl methyl ether, vinyl ethyl ether, vinyl propyl ether, vinyl isopropyl ether, vinyl butyl ethers, vinyl hexyl ethers, vinyl 2-ethylhexyl ether and vinyl octyl ethers. The ethers in which the alkyl group has from 1 to 4 carbon atoms are preferred. Among the preferred class of vinyl ethers are methyl vinyl ether, ethyl vinyl ether, propyl vinyl ethers and the butyl vinyl ethers.

The third monomeric material, which is optional, is a crosslinking agent which contains a plurality of polymerizable $CH_2=C<$ groupings and which is copolymerizable with the alpha-beta unsaturated acid anhydride and the vinyl alkyl ether monomers to form cross-linked water-swellable terpolymers. Illustrative cross-linking agents include the polyunsaturated hydrocarbons such as divinyl benzene, divinyl naphthalene, divinyl cyclohexane, low molecular weight polymerized dienes such as polybutadiene and other conjugated diene polymers having substantial unsaturation remaining in the molecule; unsaturated sulfones such as hexaallyl trimethylene trisulfone; unsaturated amides such as trimethacrylyl triazine; di- and polyunsaturated esters such as ethylene glycol diacrylate, allyl acrylate, allyl cinnamate, diallyl maleate, diallyl phthalate, diallyl malonate, etc.; polyunsaturated acids such as beta-styryl acrylic acid, etc.; polyunsaturated anhydrides such as acrylic anhydride, methacrylic anhydride, etc.; polyunsaturated ethers such as divinyl ether, diallyl ether, diallyl ethylene glycol ether, 1,4,5,8-naphthalene tetrol ethers, the vinyl, allyl, methallyl and crotyl polyethers containing 2 to 7 or more alkenyl ether groups per molecule; polyunsaturated ketones such as divinyl ketone and diallyl ketone; and polyunsaturated compounds containing one or more functional groups such as the half ethers, allyl-beta-allyoxy propionate and allyl methacrylyl sucrose, the half ester monoallyl maleate, the partial ethers of polyhydric alcohols such as diallyl glycerol ether, polyallyl sucrose, polyallyl glucose and other polyallyl derivatives of carbohydrates and polyalcohols, including polyallyl sorbitol, polyallyl mannitol and other polyallyl ethers of sugar-derived alcohols. The carbohydrate polyallyl ethers usually contain 3 or more allyl groups on each molecule.

The preferred class of cross-linking agents are the polyunsaturated hydrocarbons, solvent soluble polymeric open-chain aliphatic conjugated dienes, and the polyalkenyl polyethers of polyalcohols containing at least 4 carbon atoms and at least 3 hydroxyl groups. All of these preferred cross-linking agents must contain a plurality of polymerizable $CH_2=C<$ groups, the double bond of which are not in conjugated relationship one with the other. Specific examples of the latter include polyallyl glucose, polyallyl sucrose, polyallyl levulose, polyallyl erythritol, polyallyl pentaerythritol, polyallyl sorbitol, polyallyl mannitol and the polyallyl disaccharides. The amount of cross-linking agent can vary from about 0.1% to about 10% of the combined weight of the remaining monomers.

Maleic acid anhydride and its substituted derivatives tend to form alternating copolymers with most other monomers with which they are copolymerizable. Therefore, substantially molar equivalents of the anhydrides and alkyl vinyl ethers should be used in preparing the cross-linked polymer. If desired, however, up to about 20% of the total monomeric mixture can consist of other monoolefinic monomers such as styrene, acrylonitrile, vinyl chloride, vinylidene chloride, vinyl acetate, vinyl benzoate, diethyl maleate, ethylene, isobutylene or acrylic acid. In preparing cross-linked polymers, it is preferred to use only the essential monomeric materials described heretofore, namely, a maleic anhydride, a vinyl alkyl ether and a cross-linking agent.

Both the cross-linked and non-cross-linked polymers can be converted to partial esters, partial amides or salts by reaction with a primary or secondary alcohol, ammonia or a primary or secondary amine or an inorganic metallic alkaline material. Representative alcohols are preferably aliphatic types having from 1 to about 18 carbon atoms. The amines may be either aliphatic or aromatic and must have at least one replaceable hydrogen on the amine nitrogen. The number of carbon atoms in the amine can vary from 1 to 18. The preferred salt forming groups are those of the alkali metals. Methods of preparing these derivatives are described in detail in my copending application, Serial No. 404,784.

The specific examples which follow are intended to describe in detail the mode of practicing this invention but are not to be construed as limitations thereon. The parts are given by weight unless specifically indicated otherwise. In all instances viscosities are given in poises. Benzoyl peroxide at 1% concentration was employed as a catalyst in preparing the anhydride form of the polymers.

*Example I*

A linear polymer was prepared from equimolar quantities of maleic anhydride and methyl vinyl ether in benzene at a temperature of 50° C. The polymer separated from the liquid as a very fine powder which was filtered and dried. A portion of the dried polymer was neutralized with sodium hydroxide to convert about 75% of the carboxyl or potential carboxyl groups to sodium salts. A solution containing 10% of the above-described sodium salt in water was prepared. An aliquot of this solution was set aside as a control in a stoppered bottle at a temperature of 50° C. The initial viscosity of the solution was 472 when determined on a Brookfield RVF Viscosimeter using a number 7 spindle at 20 r.p.m. At the end of three weeks the control had a viscosity of 20. To another portion of the polymer salt solution 0.7%, based on the weight of the mucilage, of 8-hydroxy quinoline was added and this mucilage was then stored in stoppered bottles at 50° C. The initial viscosity determined by the method described above was 608 and after three weeks of aging the viscosity was 88.

Another polymer prepared by the method described was treated with sodium hydroxide to neutralize approximately 75% of the carboxyl or potential carboxyl groups. A mucilage containing 10% of the salt in water was prepared and 1.4% of 8-hydroxy quinoline was added to the mucilage. The initial viscosity of this mucilage was 1088 and at the end of three weeks storage at 50° C. the viscosity was 200.

*Example II*

A cross-linked polymer was prepared in benzene by reacting at 50° C. equimolar quantities of maleic anhydride and methyl vinyl ether with 1%, based on the weight of the above monomers of allyl sucrose containing approximately 5.8 allyl groups per sucrose molecule. The cross-linked polymer was treated with aqueous sodium hydroxide to convert the polymer to a 75% partial salt. The initial viscosity of a 1.5% mucilage was 900. After 7 weeks at 50° C. the viscosity was reduced to 200. In contrast therewith, a 1.5% mucilage of the same partial polymeric salt to which 0.1% of 8-hydroxy quinoline was added had an initial viscosity of 1080 and a final viscosity at the end of 7 weeks of 560. Another aliquot containing 0.3%, based on the mucilage, of 8-hydroxy quinoline had an initial viscosity of 1100 and a final viscosity of 720 after 7 weeks at 50° C.

*Example III*

A cross-linked polymer prepared as above, with the exception that it contained 3% allyl sucrose as a cross-linking agent, was neutralized to about 75% of its salt-forming capacity and a 1.5% mucilage was prepared by dissolving the partial salt in water. The initial viscosity was 1420 and after aging three weeks at 50° C. the final viscosity of the untreated polymeric salt dropped to 740. To an aliquot of the same mucilage 0.3% of 8-hydroxy quinoline was added. This mucilage had an initial viscosity of 1320 and after three weeks at 50° C. the viscosity was 1100.

*Example IV*

A cross-linked polymer of maleic anhydride methyl vinyl ether and 4% allyl sucrose was prepared by the method of Example II and thereafter neutralized to convert the polymer to a 75% sodium salt. Mucilages containing 1.5% of the salt were prepared. The control to which no stabilizing ingredient was added had an initial viscosity of 900. After five weeks at 50° C. the viscosity dropped to 200. This same mucilage to which 0.1% of 8-hydroxy quinoline was added had an initial viscosity of 1080 and a final viscosity after five weeks at 50° C. of 720. Another aliquot of the mucilage containing 0.3% of 8-hydroxy quinoline had an initial viscosity of 1100 and a final viscosity of 720 when held under the same conditions as the control.

*Example V*

A cross-linked polymer was prepared in benzene at

50° C. from equimolar quantities of maleic anhydride and methyl vinyl ether using 1% allyl sucrose as a cross-linking ingredient. One portion of the benzene slurry was then treated with 1 molar equivalent of methyl alcohol for each mole of maleic anhydride to form a partial methyl ester with the anhydride groups. Another portion of the slurry was treated with a half molar portion of dodecyl alcohol for each mole of maleic anhydride to form the partial dodecyl ester of the polymer. Each of these partial esters was further neutralized with sodium hydroxide until approximately 75% of the remaining carboxyl groups were converted to the sodium salts. Each of these salts thereafter was added to water to form a 1.5% mucilage. The control using the partial methyl ester-salt had an initial viscosity of 100 and a final viscosity at the end of three weeks at 50° C. of 16. This same mucilage to which 0.3% 8-hydroxy quinoline was added had an initial viscosity of 48 and a final viscosity of 40 after three weeks aging at 50° C. The partial dodecyl ester-salt had an initial viscosity of 488 and a final viscosity of 88 at the end of three weeks at 50° C. The same mucilage stabilized with 0.3% 8-hydroxy quinoline had an initial viscosity of 400 and a viscosity of 320 after storing three weeks at 50° C.

*Example VI*

It is not necessary to add aqueous solutions of 8-hydroxy quinoline to the aqueous mucilages formed from the polymer. It is possible to treat the newly formed polymer with 8-hydroxy quinoline and thereby convert a portion of the anhydride groups on the polymer chain to ester linkages in which the 8-hydroxy quinoline forms a part of the ester group. A polymer was prepared at 50° C. in benzene by reacting equimolar portions of maleic anhydride and methyl vinyl ether with 1 part of allyl sucrose as a cross-linking agent. To the slurry was added a molar equivalent of 8-hydroxy quinoline which reacted with part of the anhydride groups to form a partial ester. This polymer was then treated with sodium hydroxide to convert approximately 75% of the remaining carboxyl and anhydride linkages to the sodium salt. A 1.5% mucilage of this partial ester-salt polymer was prepared in water. It had an initial viscosity of 156 and at the end of three weeks at 50° C. the viscosity was 104.

*Example VII*

A cross-linked polymer was prepared in benzene at 50° C. from an equimolar mixture of maleic anhydride and methyl vinyl ether with 2% by weight based on the above comonomers of methylene-bis-methacrylamide as a cross-linking agent. The dried polymer was neutralized to about 75% of its salt-forming capacity with aqueous sodium hydroxide. A 1.5% mucilage of the partially neutralized polymer had an initial viscosity of 416 and after two weeks at 50° C. the viscosity dropped to 64. An aliquot of the same partial salt containing 0.3% 8-hydroxy quinoline as a stabilizing ingredient had an initial viscosity of 400 and at the end of two weeks at 50° C. it had a viscosity of 288.

Other maleic anhydride-alkyl vinyl ether copolymers in water are also stabilized against severe loss in viscosity by the addition of 8-hydroxy quinoline. It is not necessary to prepare a water mucilage of the polymer before adding the stabilized ingredient. One method of including the stabilizer as an integral part of the polymer molecule is described in Example VI. Another method is to add to the dry polymer the proper proportions of 8-hydroxy quinoline with or without the requisite amount of dry alkali metal neutralizing ingredient and form the mucilage directly, from either the acid form polymer in aqueous alkali or from the dry partially neutralized polymer blended with 8-hydroxy quinoline and neutralizing agent.

Maleic anhydride need not be the only acid forming monomer in the combination that is polymerized. As mentioned hereinabove up to about 20% of another monoolefinic comonomer can be copolymerized with the anhydride, the alkyl vinyl ether with or without a cross-linking agent.

Although I have described the invention by means of specific examples they are intended to be illustrative only and not as limitations for it will be apparent to those skilled in the art that numerous modifications can be made in the proportions of the ingredients and their order of addition without departing from the spirit and scope of the appended claims.

I claim:

1. A mixture having improved viscosity stability in aqueous dispersions and solutions comprising water-swellable derivatives selected from the class consisting of (A) linear copolymers of copolymerized monomers consisting essentially of (1) alpha-beta olefinically unsaturated aliphatic dicarboxylic anhydrides, (2) vinyl alkyl ethers having from 1 to 10 carbon atoms in the alkyl group and (3) from 0 to 20% by weight, based on the combined weights of (1) and (2) of a different monoolefinically unsaturated monomer copolymerizable with said anhydrides and vinyl alkyl ethers, and (B) cross-linked copolymers of (1), (2) and (3) with from about 0.5 to about 10% by weight based on (1), (2) and (3) of a monomer having a plurality of $CH_2=C<$ groups which is copolymerizable with (1) and (2), said derivatives being selected from the class consisting of salts of monovalent inorganic cations formed by converting at least a portion of the anhydride groups to salts, partial ester-partial salts in which a portion of the anhydride groups are converted to esters of monohydric aliphatic alcohols having from 1 to 18 carbon atoms and a portion of the carboxyl groups are converted to monovalent inorganic salts, and partial amides-partial salts in which a portion of the anhydride groups are converted to amides of ammonia and amines having from 1 to 18 carbon atoms and a portion to monovalent inorganic salts, and from about 3% to about 120% based on the weight of said copolymers of 8-hydroxy quinoline as a stabilizing ingredient.

2. The composition of claim 1 in which the anhydride is maleic anhydride.

3. The composition of claim 1 in which the vinyl ether is methyl vinyl ether.

4. The composition of claim 1 in which the polymer is a copolymer of maleic anhydride and methyl vinyl ether.

5. A mucilage comprising a dispersion of the composition of claim 1 in water in which the 8-hydroxy quinoline is present in a quantity of from about 0.05% to about 5% by weight of the mucilage.

6. A mucilage comprising an aqueous dispersion of water-swellable derivatives of (A) a copolymer of substantially equimolar proportions of (1) maleic anhydride, (2) methyl vinyl ether and (3) from about 0.5 to about 5% by weight based on the combined weight of (1) and (2) of polyallyl ether of a polyhydric alcohol having at least 5 carbon atoms and at least 4 allyl ether groups, and (B) from about 0.1 to about 1.0% by weight based on said mucilage of 8-hydroxy quinoline, said derivative being selected from the class consisting of alkali metal salts formed by converting at least a portion of anhydride groups to salts, partial ester-partial alkali metal salts in which a portion of the anhydride groups are converted to esters of monohydric aliphatic alcohols having from 1 to 18 carbon atoms and a portion of the carboxyl groups are converted to alkali metal salts and partial amides-partial salts in which a portion of the anhydride groups are converted to amides of ammonia and amines having from 1 to 18 carbon atoms and a portion to alkali metal salts.

7. The composition of claim 6 in which the 8-hydroxy quinoline content of the mucilage is from about 0.1 to about 0.7% by weight.

8. A method of stabilizing aqueous mucilages of members selected from the class consisting of (A) linear, water-swellable derivatives of copolymers of copolymerized monomers consisting essentially of (1) an alpha-beta olefinically unsaturated aliphatic dicarboxylic anhydride, and (2) a vinyl alkyl ether in which the alkyl group has from 1 to 10 carbon atoms and (3) from 0 to 20% by weight of said anhydride and said ether combined of another monoolefinic monomer copolymerizable with said anhydride and ether monomers employed in forming the copolymer, and (B) cross-linked copolymers of (1), (2) and (3) with from about 0.5 to about 10% by weight based on (1), (2) and (3) of a monomer having a plurality of $CH_2=C<$ groups comprising adding to the mucilage from about 0.05 to about 5% by weight of 8-hydroxy quinoline, said derivatives being selected from the class consisting of salts of said polymer in which a portion of the anhydride groups is converted to salts of monovalent inorganic cations, partial ester-partial salts in which a portion of the anhydride groups is converted to esters of monohydric aliphatic alcohols having from 1 to 18 carbon atoms and a portion is converted to salts of monovalent inorganic cations and partial amide-partial salts in which a portion of anhydride linkages is converted to amides with ammonia and amines having from 1 to 18 carbon atoms and a portion to salts of monovalent inorganic cations.

9. The method of claim 8 in which the polymer is a linear copolymer of maleic anhydride and methyl vinyl ether.

10. The method of claim 8 in which the polymer is a cross-linked copolymer of maleic anhydride and methyl vinyl ether in which the cross-linking ingredient is a polyallyl ether of a polyalcohol having at least 5 carbon atoms and at least 4 allyl groups, said cross-linking agent being present in the polymer in a proportion of from about 0.5 to about 4% by weight of the remaining monomer, by adding to said mucilage from about 0.1 to about 0.7% by weight of 8-hydroxy quinoline.

11. The method of claim 10 in which the cross-linking ingredient is allyl sucrose.

12. The method of claim 8 in which the cross-linking ingredient for the polymer is methylene-bis-methacrylamide.

References Cited in the file of this patent

UNITED STATES PATENTS

| | | |
|---|---|---|
| 2,116,867 | Kreimeier et al. | May 10, 1938 |
| 2,396,555 | Cox | May 12, 1946 |
| 2,541,142 | Zief et al. | Feb. 13, 1951 |
| 2,609,350 | Spatt | Sept. 2, 1952 |
| 2,694,697 | Grosser | Nov. 16, 1954 |